United States Patent [19]

Rarick

[11] 4,403,420
[45] Sep. 13, 1983

[54] DIGITAL GAUGE FOR MEASURING SAGITTAL DEPTH AND THICKNESS OF LENS, AND RELATED SYSTEM AND METHOD

[75] Inventor: Kimber W. Rarick, Muskogee, Okla.
[73] Assignee: Coburn Optical Industries, Inc., Muskogee, Okla.
[21] Appl. No.: 286,828
[22] Filed: Jul. 27, 1981
[51] Int. Cl.³ .......................... G01B 7/06; G01B 7/28
[52] U.S. Cl. ............................... 33/174 A; 33/147 N
[58] Field of Search ............. 33/143 L, 147 E, 147 N, 33/174 L, 174 A, 178 E, 178 D

[56] References Cited

U.S. PATENT DOCUMENTS

| | | | |
|---|---|---|---|
| 3,315,367 | 4/1967 | Walsh et al. | 33/178 E |
| 3,861,048 | 1/1975 | Thompson | 33/174 A |
| 3,902,249 | 9/1975 | McClughan | 33/143 L |
| 4,008,523 | 2/1977 | Von Voros | 33/147 N |
| 4,037,325 | 7/1977 | Weber et al. | 33/147 N |
| 4,171,576 | 10/1979 | Lagorsse et al. | 33/174 A |
| 4,176,460 | 12/1979 | Kaye | 33/174 L |
| 4,205,452 | 6/1980 | Wichterle et al. | 33/174 A |

Primary Examiner—Richard R. Stearns
Attorney, Agent, or Firm—John J. Byrne; Bradford E. Kile

[57] ABSTRACT

A digital gauge for measuring the sagittal depth and thickness of a lens comprises an encoder for deriving electrical signals corresponding to the saggital depth and thickness of the lens, a first digital circuit responsive to the electrical signals corresponding to the sagittal depth of the lens for producing a first digital output representing the sagittal depth, a second digital circuit responsive to the electrical signals corresponding to the thickness of the lens for producing a second digital output representing the thickness, and a display unit responsive to the first and second digital outputs for displaying the sagittal depth and thickness, respectively, of the lens. A first embodiment employs dual encoders and associated dual moveable plungers, while a second embodiment employs a single encoder and associated moveable plunger, together with a fixed stop in alignment with the plunger. According to the related methods, various sequences of a minimum number of steps are executed to manipulate the lens so as to obtain numerical display of the sagittal depth and thickness of the lens. Other features of the digital gauge include provision for retaining one or both displays of sagittal depth and thickness, and provision for calibration of the circuitry which measures the sagittal depth and thickness, respectively, of the lens. The related system automatically computes the sagittal depth and thickness by obtaining measurement data from the digital gauge on request, or by manual input of the measurement data by the operator.

20 Claims, 15 Drawing Figures

DIGITAL GAUGE FOR MEASURING SAGITTAL DEPTH AND THICKNESS OF LENS, AND RELATED SYSTEM AND METHOD

DESCRIPTION

TECHNICAL FIELD

The present invention relates to a digital gauge, and related system and method, for measuring the sagittal depth and thickness of a lens.

BACKGROUND ART

Various gauges, devices, systems and techniques have been utilized, in the prior art, to measure the various optical dimensions of lenses. Typical of such devices is the Geneva gauge for measuring spherical surface curvatures in diopter units. In the precision optical industry, spherometers of higher accuracy are required for gauging the radius of curvature. However, such spherometers have the drawback that charts are required to convert sagittal depth measurements into radius of curvature measurements, or diopters.

Attempts to improve on this technology have included the development of a compensated diopter gauge, such as disclosed in U.S. Pat. No. 3,861,048-Thompson. In that patent, a diopter gauge having a large scale and associated indicator needle is provided, one diopter being indicated by each complete revolution of the indicator needle. A compensating scale is associated with the large scale and indicator needle, such that the indicator needle may be set to compensate for the linearity error of the sagittal depth measurements versus diopters, and so that the sagittal measurement scale is actually reading diopters. The measurement technique disclosed in the aforementioned U.S. patent comprises the following steps: (1) place a flat lens on a contact ring, (2) zero out the gauge, (3) replace the flat lens with a lens to be measured, and (4) read the sagittal depth measurement, in diopters, on the gauge.

Further drawbacks of an arrangement such as disclosed in the Thompson patent are evident. Thompson does not disclose a gauge for digitally measuring the sagittal depth of a lens. Thus, a precise numerical measurement is not displayed. In addition, the Thompson gauge is a very simple, single-measurement gauge in that it only measures sagittal depth. There is no provision, in the Thompson gauge, for the additional measurement of lens thickness. Thus, such a gauge does not provide a convenient means for measuring all the lens dimensions typically employed in lens fabrication procedures, and is also not amenable to being employed in an automated (data processor) system.

A second arrangement of the prior art, disclosed in U.S. Pat. No. 2,646,627-Tillyer et al, comprises a thickness gauge for lenses. However, such an arrangement is quite similar to the gauge disclosed in the previously discussed patent, in that the thickness gauge of Tillyer et al comprises a strictly mechanical gauge, and thus does not numerically display (via a digital display) the thickness of the lens. In addition, as is the case with the previous patent, this patent discloses a thickness gauge which is not amenable to being employed in an automated (data processing) system. Finally, the thickness gauge of Tillyer et al comprises a mere single-measurement gauge.

A further prior art arrangement disclosed in U.S. Pat. No. 4,205,452-Wichterle et al, relates to a dual-measurement gauge, that is, a measuring set for determination of the sagittal depth and the average central curvature of contact lenses. However, the arrangement of this patent merely provides an analog device for measuring and indicating the sagittal depth and central curvature of the lens. Thus, the precision normally associated with digital measuring instruments is not provided by the arrangement of Wichterle et al. In addition, the arrangement of Wichterle et al, and the associated technique of measuring, require searching back and forth between the various measuring units, as well as multiple operator motions in connection with movement of the lens in order to obtain the desired measurements.

DISCLOSURE OF INVENTION

The present invention relates to a digital gauge, and associated system and method, for measuring the sagittal depth and thickness of a lens. More specifically, the digital gauge of the present invention includes an optical encoder arrangement for deriving electrical signals corresponding to the sagittal depth and thickness, respectively, of the lens, as well as respective digital devices responsive to the electrical signals corresponding to the sagittal depth and thickness, respectively, of the lens for producing respective first and second digital outputs representing the sagittal depth and thickness, respectively, of the lens, and display means for numerically displaying the sagittal depth and thickness, respectively, of the lens.

In a first embodiment of the invention, the digital gauge includes a cabinet having a bell mounted on a top surface of the cabinet, a first moveable plunger extending vertically upward from within the cabinet and through the center of the bell. The gauge arrangement further comprises a top portion located above the top surface of the cabinet and the bell, and a second moveable plunger extending vertically downward from the top portion and in alignment with the vertical upward extension of the first moveable plunger. This digital gauge arrangement is known as a dual-encoder arrangement, since the digital gauge includes a first optical encoder within the cabinet and associated with the first moveable plunger so as to derive electrical signals representing the sagittal depth of the lens in response to movement of the first moveable plunger, as well as a second optical encoder within the top portion of the digital gauge, and associated with the second moveable plunger so as to derive electrical signals representing the thickness of the lens in response to movement of the second moveable plunger.

However, hardware economy can be achieved by employment of a second embodiment of the digital gauge, this embodiment being known as a single-encoder arrangement. In the second embodiment of the invention, a bell is again mounted on the top surface of the cabinet, and a first moveable plunger extends vertically upward from within the cabinet and through the center of the bell. A fixed stop extends from the top portion, located above the top surface of the cabinet and the bell, downwardly toward the moveable plunger. In addition, a single optical encoder is provided within the cabinet, the single optical encoder being responsive to movement of the moveable plunger so as to derive electrical signals corresponding to that movement. In this embodiment, first digital means responds to the electrical signals corresponding to the movement of the moveable plunger from a zero position relative to the bell to a first measuring position for counting from an initial count to a further count value so as to develop a first digital output representing the sagittal depth of the lens. Similarly, a second digital means responds to the electrical signals corresponding to the movement of the movable plunger from a zero position relative to the fixed stop to a second measuring position for counting from an initial count value to a further count value so as to develop a second digital output representing the thickness of the lens.

In a further embodiment of the present invention, a first digital counter is employed, and is responsive to the electrical signals corresponding to the sagittal depth of the lens for producing a first digital output representing the sagittal depth of the lens, while a second digital counter is employed, and is responsive to the electrical signals corresponding to the thickness of the lens for producing a second digital output representing the thickness of the lens.

The digital gauge of the present invention can be employed in a system for automatically computing the sagittal depth and thickness of a lens, the system comprising: an optical encoder for deriving electrical signals corresponding to the sagittal depth and thickness, respectively, of the lens; digital circuitry responsive to the electrical signals corresponding to the thickness of the lens and the sagittal depth of the lens, respectively, for producing first and second digital outputs; and processor means for receiving and processing the first and second digital outputs to derive the thickness and sagittal depth, respectively, of the lens to be measured.

The present invention further relates to a method of measuring the sagittal depth and thickness of a lens utilizing a digital gauge unit having a top surface, a bell mounted on the top surface, a first moveable plunger extending vertically through the center of the bell, a top portion above the top surface of the unit, and a second moveable plunger extending vertically downward from the top portion in alignment with the vertical upward extension of the first moveable plunger, the method comprising the following steps: (a) placing a flat lens on the bell to zero the first moveable plunger; (b) removing the flat lens from the bell; (c) placing the lens to be measured on the bell so as to displace the first moveable plunger downward and so as to measure the sagittal thickness of the lens; (d) moving the second moveable plunger vertically downward from the top portion and through a displacement distance so as to contact the lens to be measured; and (e) computing the thickness of the lens to be measured based on the sagittal depth of the lens, as previously measured, and the displacement distance of the second moveable plunger.

Finally, the present invention also relates to a method of measuring the sagittal depth and thickness of a lens utilizing a digital gauge unit having a top surface, a bell mounted on the top surface, a moveable plunger extending vertically through the center of the bell, a sagittal depth counter and a thickness counter connected to the moveable plunger, and a fixed stop located above the top surface and the bell, and extending vertically downward toward the moveable plunger, the method comprising the following steps: (a) moving the moveable plunger vertically upward to contact the fixed stop; (b) resetting the thickness counter; (c) lowering the moveable plunger; (d) placing a flat lens on the moveable plunger and lowering the flat lens and moveable plunger so that the flat lens contacts the bell and resets the counter to zero; (e) removing the flat lens and placing the lens on the bell so as to displace the moveable plunger downward, and so as to measure the sagittal depth of the lens; and (f) moving the lens to be measured and the moveable plunger vertically upward until the lens contacts the fixed stop, thus measuring the thickness of the lens.

It should be appreciated that the digital gauge, and related system and method, of the present invention achieve several advantages over the prior art. Firstly, the invention provides a digital gauge which directly measures both the sagittal depth and thickness of a lens, the two measurements being taken directly and with the same measurement gauge, and with a precision appropriate for digital display of the resulting measurements. Secondly, since the same unit is utilized to obtain both measurments during a single given sequence of operations, measurement of the sagittal depth and thickness of the lens is facilitated and carried out in an efficient, quick manner, without the need for switching between different measuring units, and without an excessively large number of operator motions. Thirdly, whereas the above advantages can be achieved by utilization of either the single-encoder or dual-encoder arrangements, significant hardware savings can be achieved by employment of the single-encoder arrangement. Finally, the digital gauge and related methods are such as to facilitate employment of the gauge with an automatic system for computing the sagittal depth and thickness of a lens, in conjunction with performance of optical design computations, such as are carried out during the fabrication of lenses of desired optical dimensions and/or optical power.

Therefore, it is an object of the present invention to provide a digital gauge, and related system and method, for measuring the sagittal depth and thickness of a lens.

It is an additional object of the present invention to provide a digital gauge for measuring both the sagittal depth and thickness of a lens with a single measuring unit and by means of a single series of steps.

It is an additional object of the present invention to provide a single-encoder arrangement for digitally measuring the sagittal depth and thickness of a lens.

It is an additional object of the present invention to provide a method of measuring the sagittal depth and thickness of a lens utilizing a digital gauge unit, wherein a minimal number of operator steps are necessary to take initial zero readings of sagittal depth and thickness, as well as to obtain actual measurements of the sagittal depth and thickness of the lens.

It is an additional object of the present invention to provide a system for automatically computing the sagittal depth and thickness of a lens, utilizing a digital gauge connected to a processor which receives and processes the digital outputs from the digital gauge to derive the thickness and sagittal depth, respectively, of the lens.

The manner in which these and other objects are accomplished by the present invention will become clear from the following detailed description of a preferred embodiment.

BEST MODE FOR CARRYING OUT THE INVENTION

The invention will now be described in detail with reference to FIGS. 1, 2, and 3, FIG. 1 being a perspective view of the digital gauge unit of the present invention, FIG. 2 being a side view of the dual-encoder embodiment thereof, and FIG. 3 being a side view of the single-encoder embodiment thereof.

Figure 1:
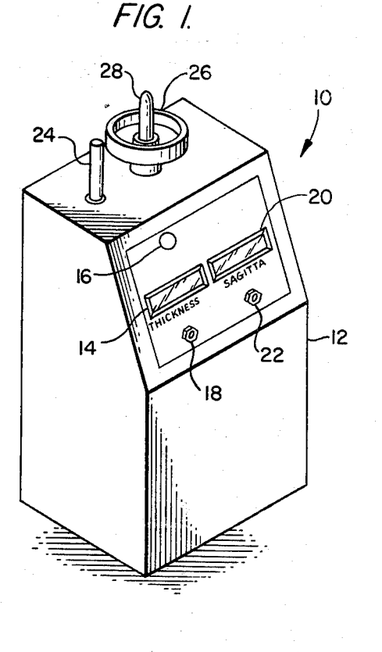
FIG. 1 is a perspective view of the inventive digital gauge unit.
Figure 2:
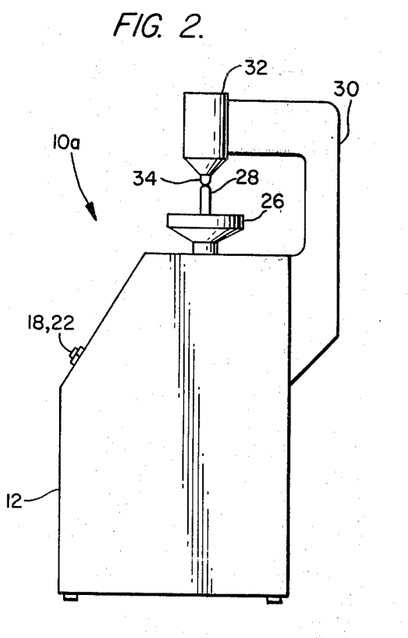
FIG. 2 is a side view of a dual-encoder embodiment of the digital gauge unit.
Figure 3:
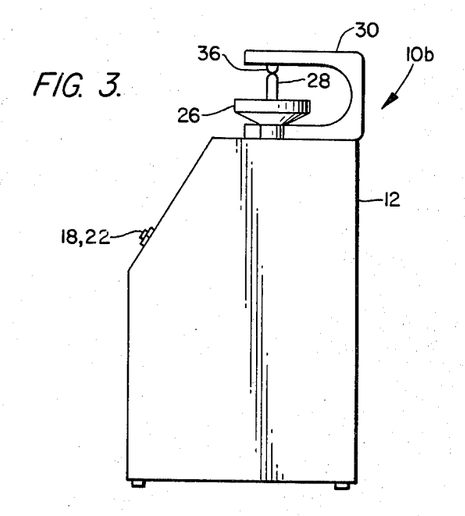
FIG. 3 is a side view of a single-encoder embodiment of the digital gauge unit.

With reference to FIGS. 1-3, the digital gauge unit 10 of the present invention basically comprises a cabinet 12, a thickness display 14 and associated retain display switch 16 and zero set switch 18, a sagitta display 20 and associated zero set switch 22, a plunger control rod 24, a bell 26, and a plunger 28. The latter elements are shown in FIG. 1, and are common to each of the embodiments shown in FIGS. 2 and 3, respectively.

FIG. 2 is a side view of the dual-encoder embodiment of the present invention. As seen in FIG. 2, the dual-encoder digital gauge 10a further comprises a thickness strap 30 connecting a top portion 32 (overhanging the cabinet 12) to the rear of the cabinet 12, and a moveable plunger 34 slidably mounted within the top portion 32 so as to move upward and downward toward and away from, the moveable plunger 28 associated with the bell 26.

The single-encoder digital gauge 10b further comprises a thickness strap 30 connected to the top face of the cabinet 12, and holding a fixed stop 36 in a position over the moveable plunger 28 associated with the bell 26.

The digital gauge units 10a and 10b shown in FIGS. 2 and 3, respectively, constitute embodiments of a stand-alone digital gauge unit. However, as will be seen below, such digital gauge units 10a and 10b can be employed as part of an overall computer system for measuring sagittal depth and thickness of a lens, as well as for performing various computations associated with optical design and fabrication.

The particular measurement techniques employed with each of the two embodiments in FIGS. 2 and 3 will now be described. With reference to FIG. 2, the measurement technique associated with the dual-encoder embodiment is as follows. A flat (reference) lens is placed on the moveable plunger 28 which is lowered so that the flat lens contacts the bell 26. The zero set switch 22 associated with the sagitta display 20 is pressed to zero the sagitta counting circuitry (not shown). A special reference flat 27 (FIG. 4C) is placed on the bell 26 so that the counter associated with the thickness encoder (not shown) can be zeroed by pressing the zero set switch 18 (FIG. 2). The reference flat 27 is then removed from the bell 26, and a lens to be measured is placed on the bell 26.

Figure 4A:
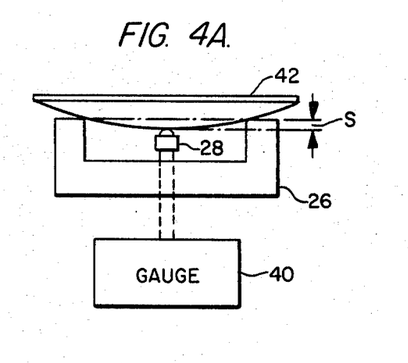
FIG. 4A is a side view of the bell employed in the digital gauge unit for measuring a convex lens.
Figure 4B:
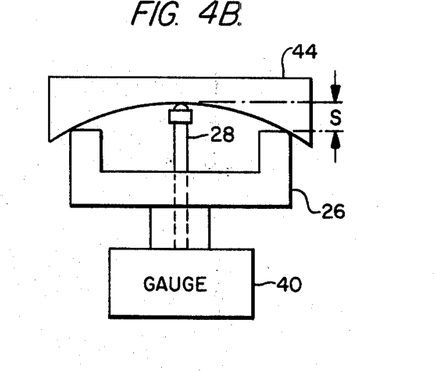
FIG. 4B is a side view of the bell employed with a digital gauge unit for measuring a concave lens.

Reference is now made to FIGS. 4A & 4B, which show a convex lens 42 and a concave lens 44, respectively, placed on the bell 26 associated with the digital gauge circuitry 40. As seen in FIG. 4A, if the lens 42 is a convex lens, the plunger 28 is further displaced inside the bell 26 by a displacement distance S, and the gauge 40 automatically displays the sagittal depth of the lens on the sagitta display 20 (FIG. 1). In the case of a concave lens 44, once the lens 44 is placed on the ball 26, the plunger control rod 24 (FIG. 1) can be operated to raise the plunger 28 so as to contact the concave surface of the lens 44, and the sagittal depth is automatically displayed by the digital gauge circuitry 40 on the sagitta display 20.

Returning to consideration of FIGS. 1 & 2, once the sagittal depth of the lens has been measured, the second plunger 34 is lowered from the top portion 32 so as to contact the top surface of the lens 42 or 44. The displacement distance through which the plunger 34 moves can be used in conventional computations in order to compute the thickness of the lens, given the sagittal depth previously computed and the displacement distance through which the plunger 34 has moved. Such conventional computations can be performed, for example, by means of counting circuitry, as seen below.

The dual-encoder gauge 10a constitutes one embodiment of the digital gauge of the present invention. However, it is to be noted that substantial hardware savings can be achieved by employment of a further embodiment, and therefore a preferred embodiment of the digital gauge, as seen in FIG. 3. That is to say, the additional encoder circuitry (not shown) contained in the top portion 32 of the embodiment of FIG. 2, and associated with the moveable plunger 34, can be eliminated, and the moveable plunger 34 can be replaced by a fixed stop 36. Operation of the single-encoder gauge 10b of FIG. 3 is as follows. The moveable plunger 28 is moved vertically upward to contact the fixed stop 36, and the zero display button 18 is utilized to zero the thickness counting circuitry (not shown) and associated display 14. The moveable plunger 28 is then lowered, and a flat lens is placed on the moveable plunger 28. The flat lens and the moveable plunger 28 are then lowered until the flat lens contacts the bell 26, and the zero display button 22 is utilized to zero the sagitta counting circuitry (not shown) and sagitta display 20. The flat lens is then removed, and a lens to be measured is placed on the moveable plunger 28 (as shown in FIGS. 4A and 4B), so as to displace the moveable plunger 28 through a displacement distance corresponding to the sagittal depth of the lens. As a result, the sagittal depth of the lens is displayed on sagitta display 20. The lens and plunger 28 are then moved vertically upward until the lens contacts the fixed stop 36, at which time the thickness of the lens is automatically displayed on thickness display 14.

It should be noted that the latter steps associated with the embodiment of FIG. 3 can be reordered in order to perform the same measurement functions. For example, initially, a flat lens could be placed on the moveable plunger 28 and lowered until the flat lens contacts the bell, and the zero set switch 22 operated to zero the sagitta display. Then, the flat lens could be removed, and the moveable plunger 28 moved vertically upward to contact the fixed stop, the zero set switch 18 then being actuated to zero the thickness display 14. Then, the moveable plunger could be lowered, a lens to be measured placed on the moveable plunger 28, and the plunger 28 and lens to be measured raised until the lens contacts the fixed stop 36, at which time a thickness reading will be displayed on the display 14. At that point, the retain display button 16 can be operated to save the thickness reading, while the lens and the plunger 28 are then lowered until the lens contacts the bell 26, at which time the sagittal depth of the lens will be displayed on the display 20.

As previously stated, a primary advantage of the present invention resides in the fact that the digital gauge of the present invention performs the combined operations of thickness measurement and sagittal depth measurement in a single unit. In addition, as a result of the employment of digital circuitry, precise numerical values can be displayed on the displays 14 and 20 with any desired degree of accuracy. Finally, the digital gauge of the present invention is specially designed so as to enable the operator to quickly and efficiently measure the thickness and sagittal depth of the lens by performance of a sequence of operations involving a minimal amount of manipulation of the lens.

Figures 4C, 5:
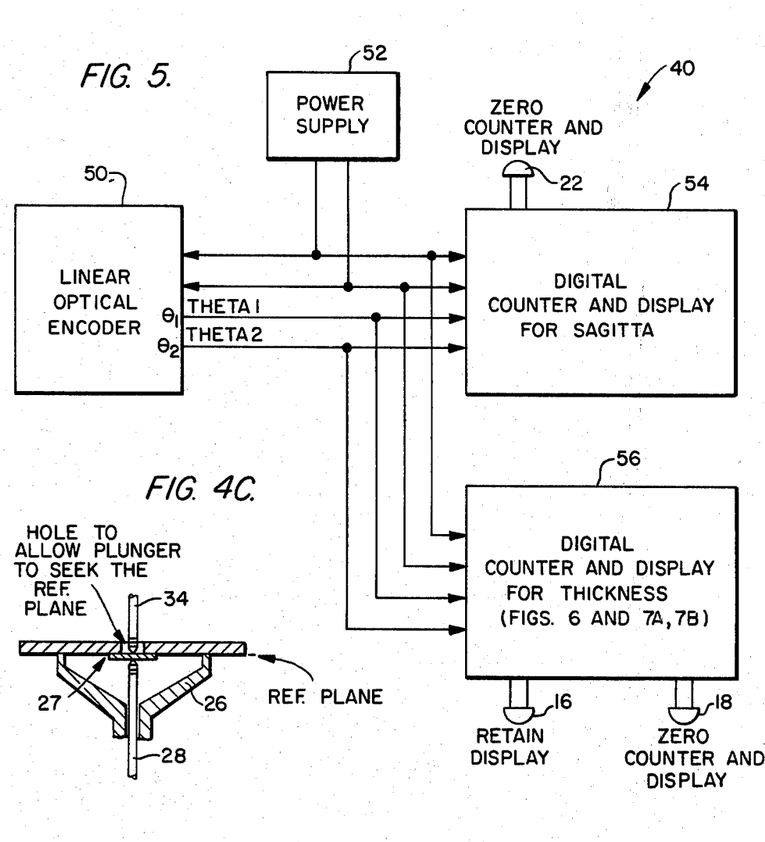
FIG. 4C is a side view showing a special reference flat used to zero the counter associated with the thickness circuitry.
FIG. 5 is a block diagram of the single-encoder embodiment of the digital gauge unit.

FIG. 5 is a block diagram of the digital gauge circuitry 40 shown in FIGS. 4A and 4B, and associated with the single-encoder embodiment of FIG. 3. As seen in FIG. 5, the single-encoder embodiment of the gauge 40 comprises a linear optical encoder 50, a power supply 52, a digital counter and display for sagitta 54, and a digital counter and display for thickness 56. Associated with the counter and display 54 is the zero counter and display 22 (corresponding to the zero set switch 22 on the cabinet 10 of FIG. 1). Associated with the counter and display 56 is the retain display 16 and zero counter and display 18 (corresponding to the retain display button 16 and zero set switch 18, respectively located on the cabinet 12 of FIG. 1).

Linear optical encoder 50 and digital counter and display for sagitta 54 are, in the preferred embodiment, components of a conventional digital linear gauge, such as the digital linear gauge DG750, manufactured by Ono Sokki of Tokyo, Japan. Accordingly, the details of the linear optical encoder 50 and digital counter and display 54 need not be presented. It is sufficient to state that, basically, the linear optical encoder 50 includes a lined grating attached to the shaft (not shown) of moveable plunger 28 (in the single-encoder arrangement of FIG. 3), so that movement of the plunger 28 results in movement of the grating lines with respect to an optical detection arrangement, optical detection of the lines being automatically encoded into electrical signals. These electrical signals are indicated as THETA1 and THETA2, the latter comprising quadrature-phase signals conventionally produced by the linear optical encoder. The signals THETA1 and THETA2 are provided to digital counter and display for sagitta 54, as well as to digital counter and display for thickness 56. In the case where the procedure calls for measurement of thickness first, the thickness displayed on counter and display 56 can be retained by operating the retain display control 16. Then, further movement of the lens and plunger 28 results in generation of further quadrature-phase outputs to the counter and display 54 (the output of counter and display 56 is not affected), and the counter and display 54 displays the sagittal depth of the lens. Of course, if sagittal depth is measured before thickness, a retain display button (such as 16) can be associated with the counter and display 54 so as retain the sagittal depth, while the lens and plunger 28 are moved to obtain the thickness.

It should be noted that FIG. 5 discloses details of the digital gauge 40 as employed in a single-encoder arrangement. In a dual-encoder arrangement, such as shown in FIG. 2, an additional linear optical encoder 50 would be provided, such that each counter and display 54 and 56 has its own linear optical encoder.

Figure 6:
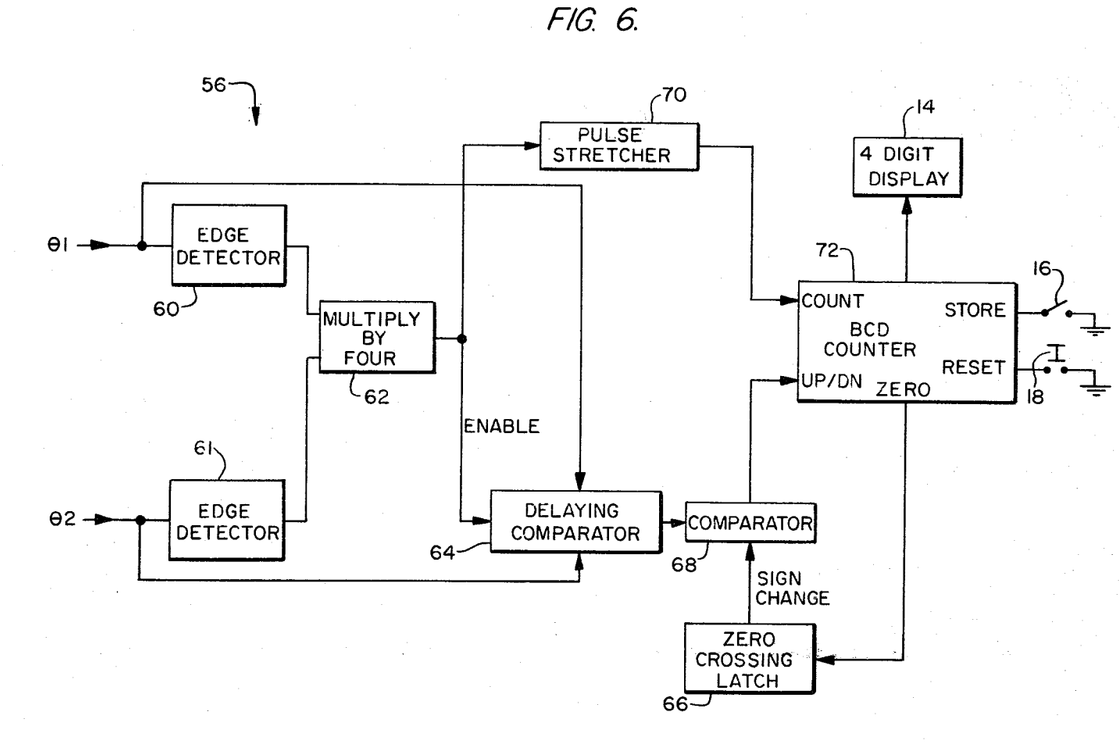
FIG. 6 is a block diagram of the digital counter and display for thickness measurement of FIG. 5.

FIG. 6 is a block diagram of the digital counter and display for thickness 56 of FIG. 5. As seen therein, counter and display 56 comprises edge detectors 60 and 61, multiply-by-four circuit 62, delaying comparator 64, zero-crossing latch 66, comparator 68, pulse stretcher 70, and counter 72, with associated display 14, retain display switch 16, and zero display switch 18. Delaying comparator 64 and comparator 68 form a quadrature-phase detector.

Figure 7A:
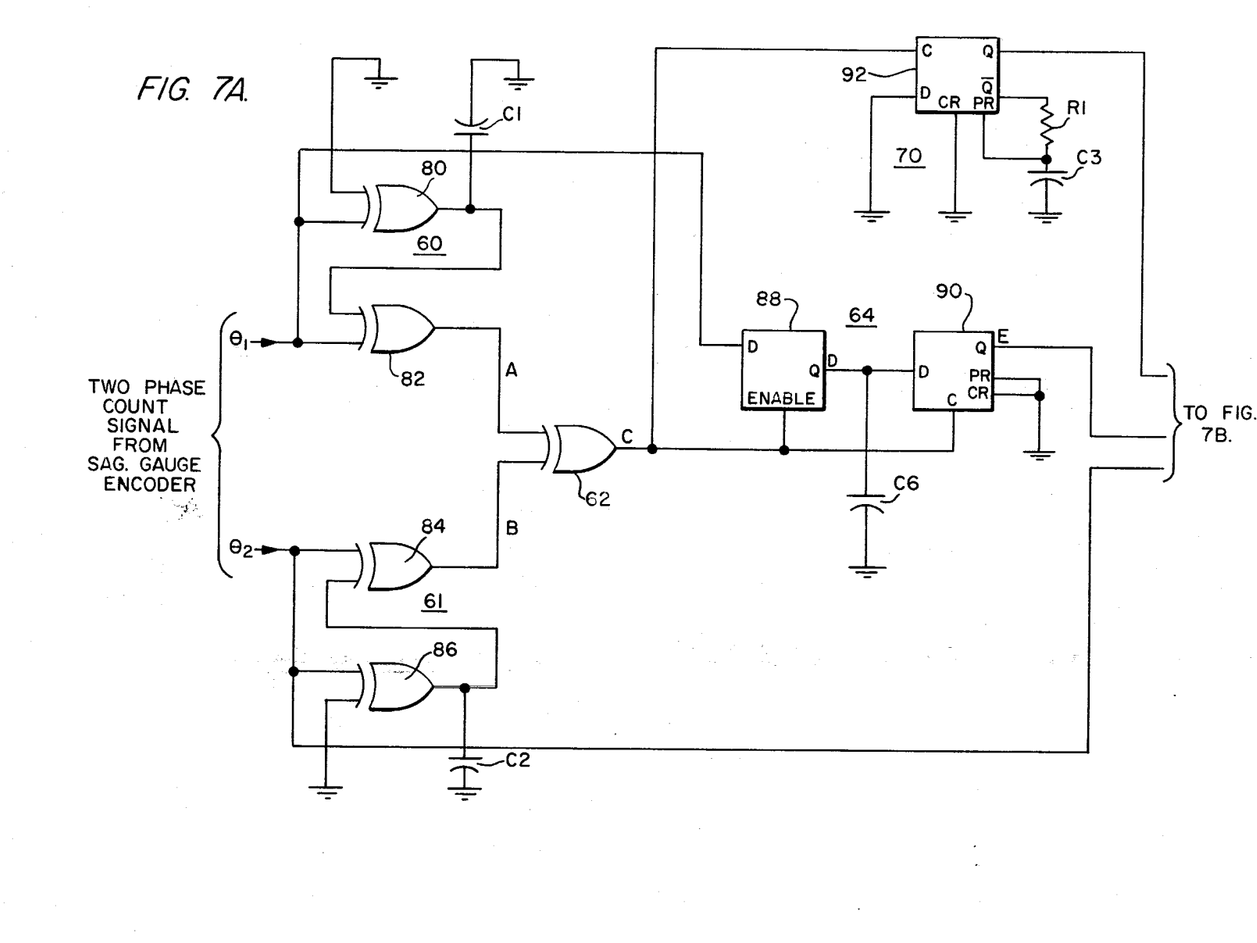
FIGS. 7A & 7B are detailed logic diagrams of the digital counter and display for thickness measurement of FIG. 6.
Figure 7B:
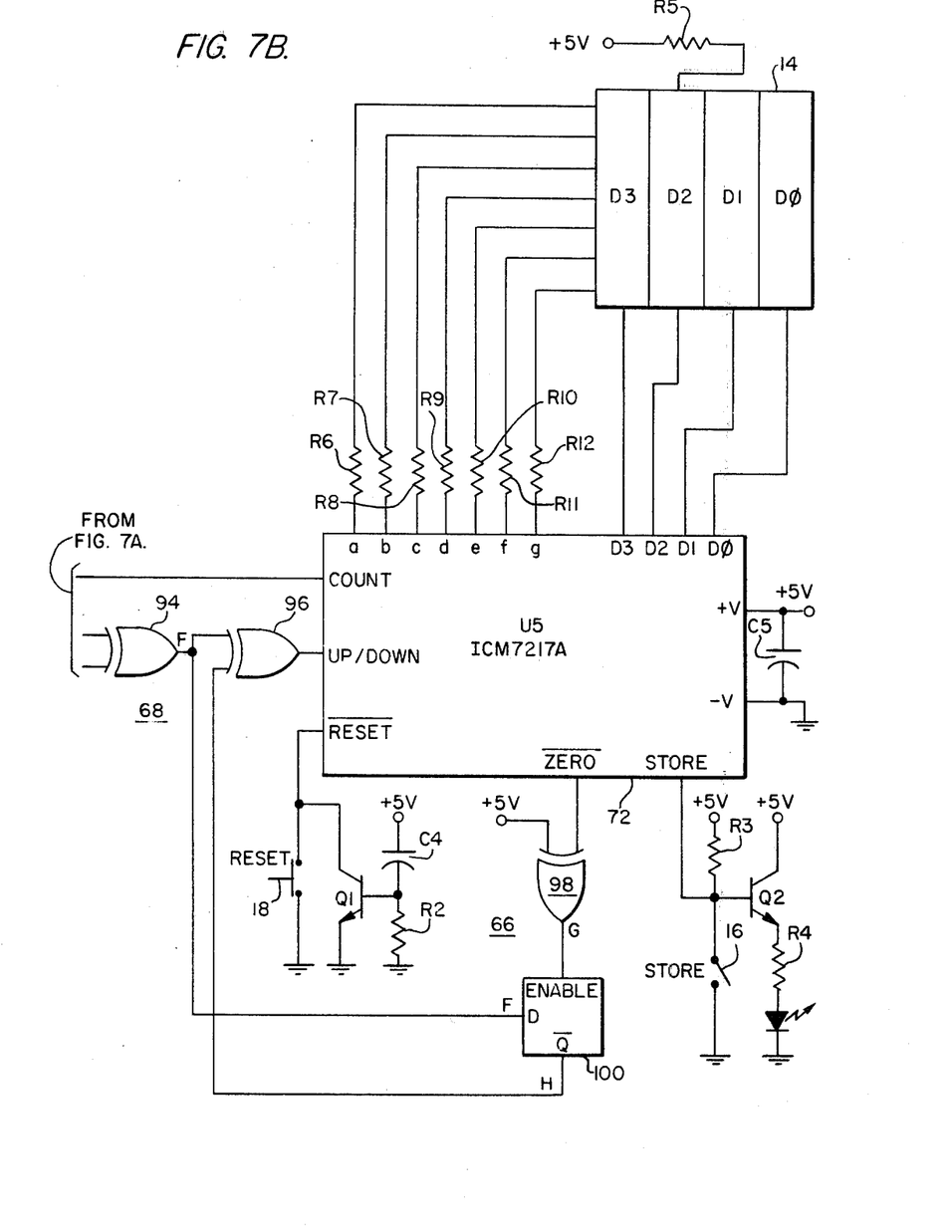

FIGS. 7A & 7B are detailed logic diagrams of the counter and display 56 of FIG. 6. The operation of the counter and display 56 of FIG. 5 will now be described with reference to FIGS. 6, 7A and 7B, as well as FIG. 7C which is a timing diagram relating to the operation of the circuit of FIGS. 7A and 7B.

In operation, the optical encoder outputs of linear optical encoder 50 (THETA1 and THETA2) are provided to exclusive-OR gates 80 and 82 (making up edge detector 60) and exclusive-OR gates 84 and 86 (making up edge detector 61), respectively. As indicated in the timing diagram of FIG. 7C, the edge detectors 60 and 61 issue a narrow pulse each time the edge of a square wave is detected in the respective optical encoder inputs (see waveform A for edge detector 60 and waveform B for edge detector 61).

Figure 7C:
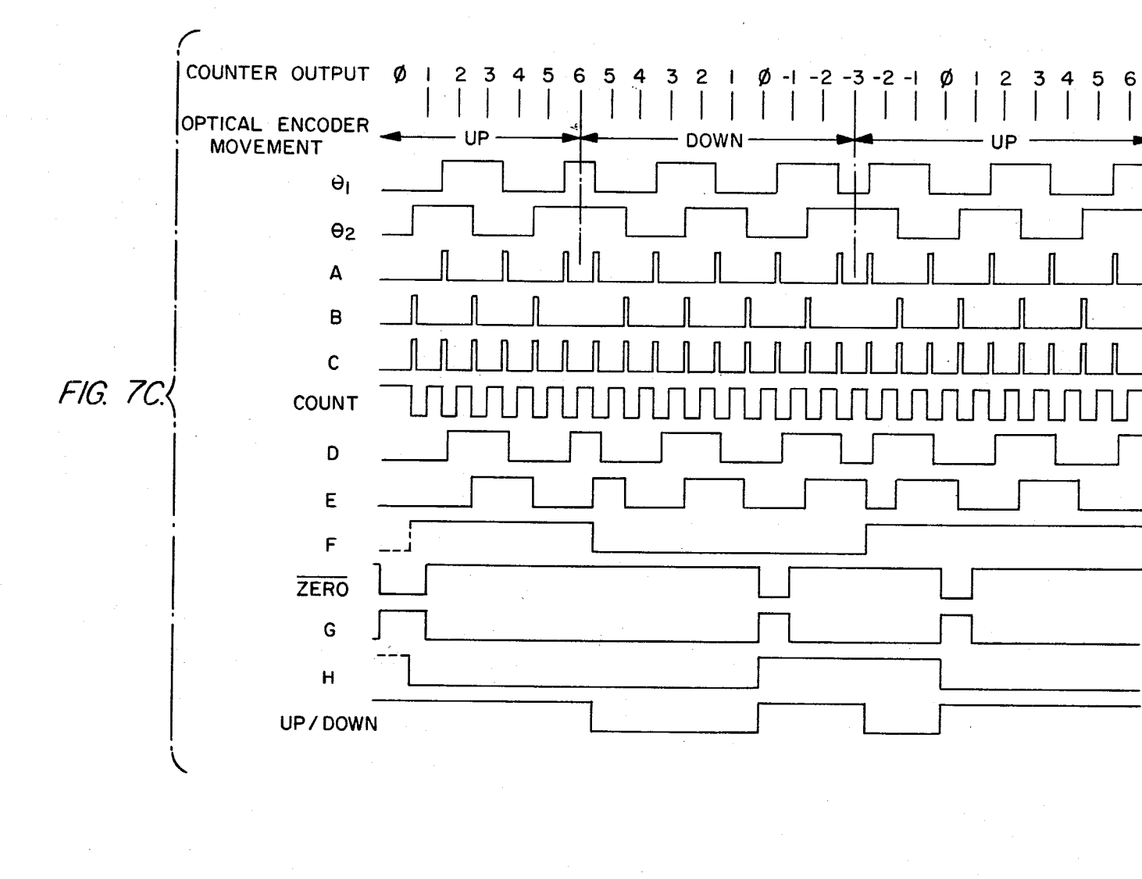
FIG. 7C is a timing diagram relating to the operation of the circuitry of FIGS. 7A and 7B.

The detector outputs A and B are combined in an exclusive-OR gate 62 (the multiply-by-four circuit 62 of FIG. 6), and the resulting waveform C is shown in FIG. 7C. The output C is provided as an enabling input to a delay flip-flop 88, and as a clock input to a further delay flip-flop 90 connected in series with flip-flop 88. The flip-flops 88 and 90, together with a capacitor C6, make up the delaying comparator 64 of FIG. 6. The outputs D and E of flip-flops 88 and 90, respectively, are shown in FIG. 7C.

The output C of multiply-by-four circuit (exclusive-OR gate) 62 is also provided as a clock input to delay flip-flop 92. Flip-flop 92, together with associated resistor R1 and capacitor C3, make up the pulse stretcher 70 of FIG. 6. The Q output of flip-flop 92 forms a COUNT input to counter 72 (FIGS. 6 and 7B), as shown in FIG. 7C.

The output E of flip-flop 90 and encoder input THETA2 are provided as inputs to exclusive-OR gate 94 (FIG. 7B), the output F of which is provided as one input to an exclusive-OR gate 96. Exclusive-OR gates 94 and 96 make up the comparator 68 of FIG. 6. The other input of exclusive-OR gate 96 is derived from the complemented output H of a flip-flop 100 which forms, together with exclusive-OR gate 98 which is connected to the complemented ZERO output of counter 72, the zero-crossing latch 66 of FIG. 6.

The output F of exclusive-OR gate 94, as derived from inputs E and THETA2, appears as shown in FIG.

7C. The UP/DOWN input to counter 72 is provided by the output of exclusive-OR gate 96 as derived from outputs F and H, also shown in FIG. 7C.

Whenever counter 72 passes through its zero state, it is necessary to reverse the counting operation so as to achieve a proper count sequence ($-3, -2, -1$, zero, $+1, +2, +3$). Accordingly, the counter 72 is provided with zero-crossing latch circuitry 66. As indicated in FIG. 7C, whenever the counter output reaches zero, the complemented ZERO output of counter 72 goes low, and this low output is inverted by exclusive-OR gate 98 to provide an enabling input G to the flip-flop 100. Flip-flop 100, thus enabled, latches the output F of gate 94, and provides an inverted output H to the other input of gate 96. Exclusive-OR gate 96 combines outputs F and H so as to continue to provide a high input to the UP/DOWN input of counter 72.

When the movement of the plunger 28 is reversed, such as at count 6 in FIG. 7C, the output F of gate 94, as derived from inputs E and THETA2, goes from high to low. Gate 96 then produces a low input to the UP/DOWN input of counter 72, causing the counter to count down from 6. Note that output F of gate 94 is high when the plunger 28 is being moved up, and is low when the plunger 28 is being moved down.

When counter 72 reaches its next zero state, gate 98 generates output G to enable flip-flop 100, which latches the output F of gate 94, and provides an inverted output H to gate 96. Gate 96 combines the outputs F and H to restore a high input to the UP/DOWN input of counter 72, causing counter 72 to again count upward from zero.

It is to be noted that, with respect to the preferred single-encoder arrangement of FIG. 3, since the plunger 28 is moved to the fixed stop 36, and the counter 72 then zeroed, the subsequent insertion of a lens between the plunger 28 and the stop 36 results in a counter reading which is directly related to the thickness of the lens. As would be obvious to one of skill in the art, the thickness counting circuitry of FIGS. 7A and 7B could be easily modified to accommodate the dual-encoder arrangement of FIG. 2.

Figure 8:
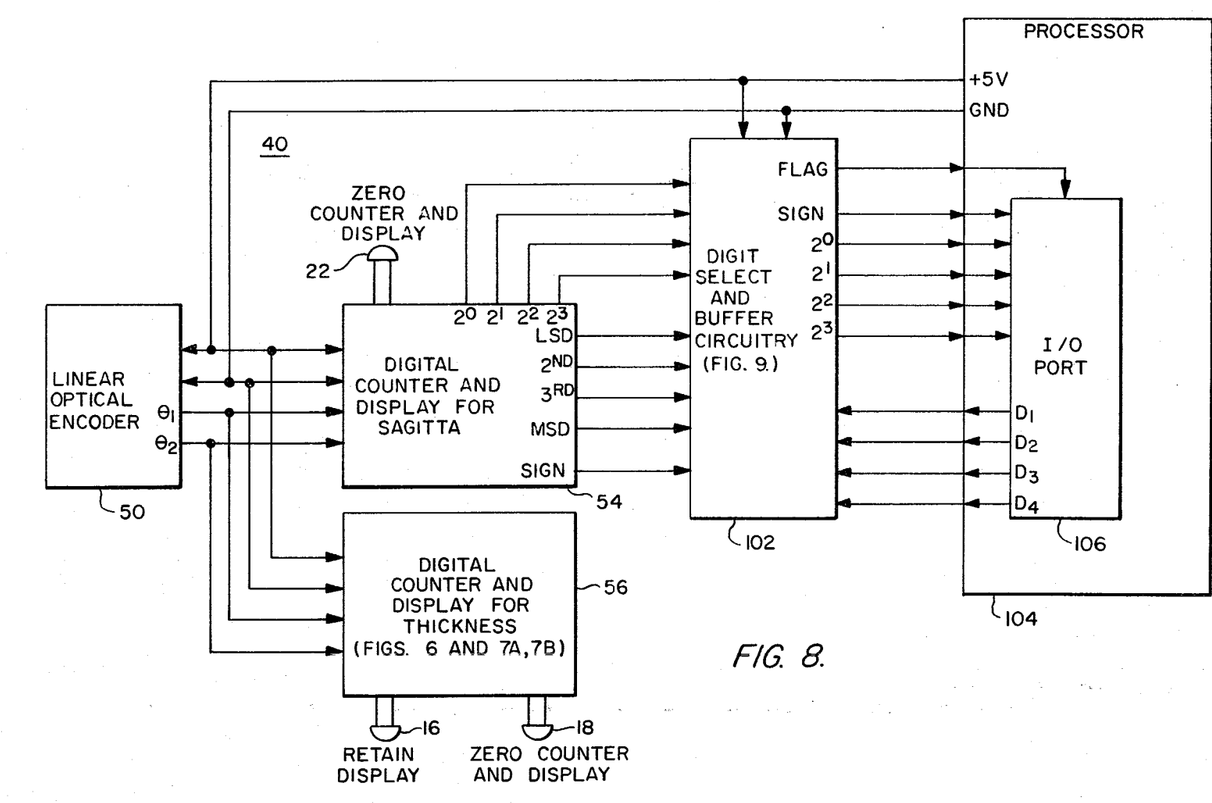
FIG. 8 is a block diagram of the single-encoder embodiment of the digital gauge unit employed with a processor in an automatic measuring system.

FIG. 8 is a block diagram of the digital gauge 40 of FIG. 5 employed with a processor in order to develop an automatic system for measuring sagittal depth and thickness of a lens. As seen therein, the linear optical encoder 50, digital counter and display for sagitta 54, and digital counter and display for thickness 56 of the digital gauge 40 are connected in an arrangement further comprising digit select and buffer circuitry 102 and processor 104, which includes I/O port 106.

Figure 9:
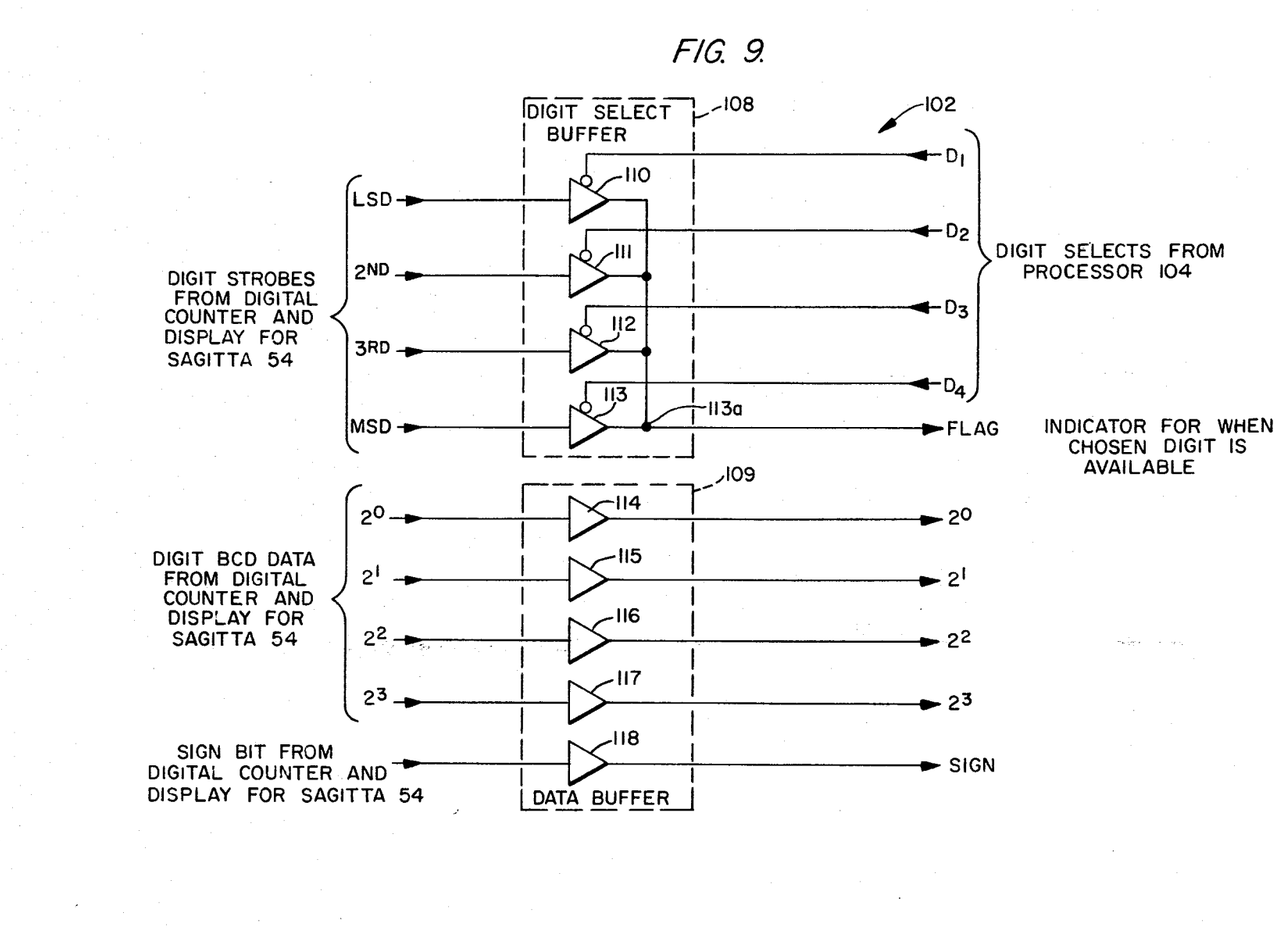
FIG. 9 is a detailed schematic of the digit select and buffer circuitry of FIG. 8.

FIG. 9 is a detailed diagram of the digit select and buffer circuitry 102. As seen therein, the digit select and buffer circuitry 102 comprises a digit select buffer 108 and data buffer 109. The digit select buffer 108 is preferably a 74125 device (manufactured by Motorola, Inc.), and includes tristate buffers 110-113 for receiving individual digit select signals from the processor 104, in response to which the digit strobes from the digital counter and display for sagitta 54 are provided, via the buffers 110-113, to the wired-OR connection 113a as a flag indicator, indicating when a chosen digit is available. The data buffer 109 preferably comprises a 7417 device (manufactured by Motorola, Inc.) and includes various tristate buffers 114-118, which receive, buffer, and pass on digital data from the digital counter and display for sagitta 54.

The operation of FIGS. 8 & 9 will now be further described with reference to FIGS. 10A & 10B, which are flow charts of the operations performed by the processor 104.

The processor 104 typically has a start-up routine which (in block 130) calls for the input of a thickness reading for calibration purposes. This corresponds to movement of the plunger 28 vertically upward to contact the stop 36 (in FIG. 3). Thus, in this arrangement, it is not necessary for the thickness display 14 (FIG. 1) to be zeroed insofar as the processor 104 is concerned, for the processor merely requires a zero-position thickness reading with which it then adjusts all future thickness readings to derive the true thickness of the lens being measured.

Figure 10A:
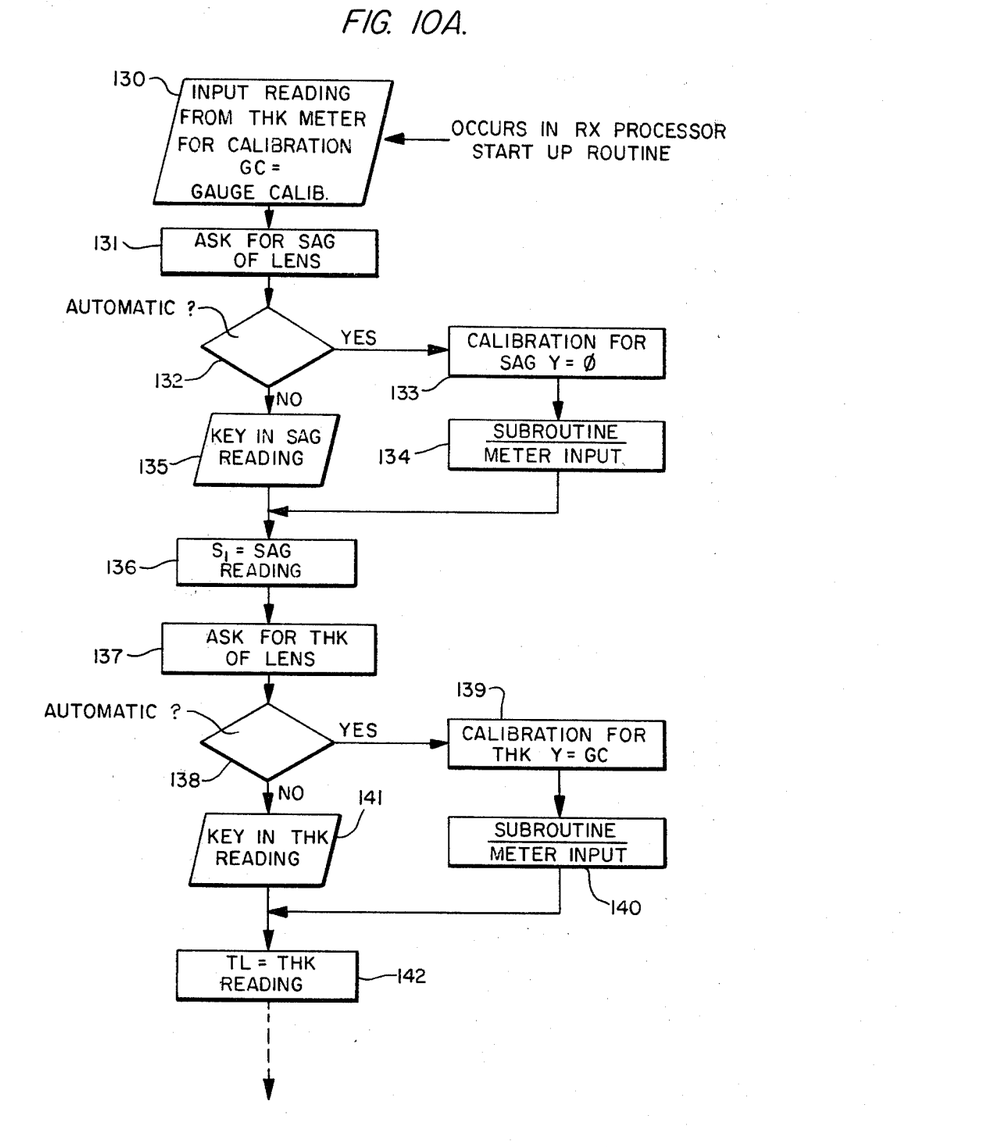
FIGS. 10A and 10B are flow charts of the operations performed by the processor of FIG. 8 in the automatic measuring system.
Figure 10B:
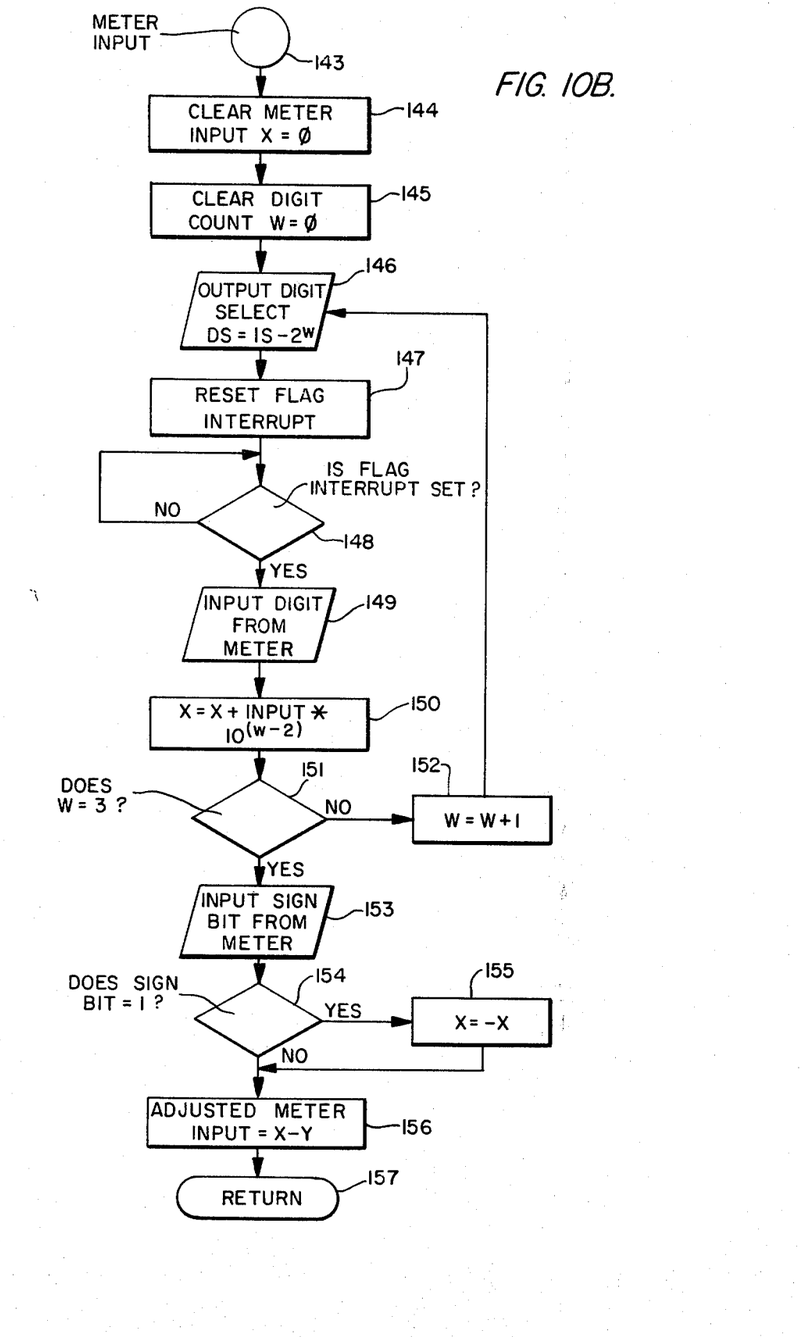

Continuing with the flow chart of FIG. 10A, the processor asks for the sagittal depth reading of the lens (block 131). Then, if automatic measurement is indicated (block 132), the processor performs a calibration for the sagittal depth reading, and enters a subroutine for meter input, such being contained in FIG. 10B (blocks 143-157). The meter input subroutine merely facilitates the reading in of sagittal depth and thickness data in binary-coded decimal format, digit by digit, under the control of a strobe signal. The meter input subroutine contained in FIG. 10B is considered self-explanatory, and will not be explained in further detail.

Returning to FIG. 10A (block 132), if automatic entry is not indicated, the operator keys in the sagittal depth reading (block 135), and the routine continues. The sagittal depth reading is defined (block 136), and the processor asks for the thickness reading. Again, if automatic entry is indicated (block 138), calibration for thickness takes place (block 139), and the thickness reading is entered by means of the subroutine for meter input (block 140). If automatic entry is not indicated, the thickness reading is keyed in (block 141), and the thickness reading is defined (block 142).

In this manner, the digital gauge unit 10 (FIG. 1) can be employed with a digital processor 104 (FIG. 8) in the "automatic" mode of operation to automatically enter sagittal depth and thickness data relative to a lens actually being measured using the digital gauge unit 10. Alternatively, in the "non-automatic" mode of operation, sagittal depth and the thickness data can be keyed in (or manually entered) by the operator. In either event, the processor 104 can then be employed, in a conventional manner, to perform optical computations necessary for lens fabrication. For example, the processor 104 can use the sagittal depth data to obtain data relative to the front curvature of the lens. The latter data can be combined with the lens power desired by the optometrist to indicate that amount of lens cutting which will be necessary in order to obtain a rear curvature of the lens, such that the front and rear curvatures of the lens will provide the desired optical power.

As a final note, of course, the digital gauge unit 10 (FIG. 1) can be employed as a stand-alone unit which displays both sagittal depth and thickness of a lens in response to manipulation of the lens with a single moveable plunger 28 (in the single-encoder arrangement of FIG. 3), or dual movable plungers 28 and 34 (in the dual-encoder arrangement of FIG. 2).

While preferred forms and arrangements have been shown in illustrating the invention, it is to be clearly understood that various changes in detail and arrangement may be made without departing from the spirit and scope of this disclosure.

I claim:

1. A digital gauge for measuring and displaying the sagittal depth and thickness of a lens, comprising:
   a base having a bell mounted thereon;
   gauging means for gauging the sagittal depth and thickness, respectively, of the lens, said gauging means comprising a gauging probe located above said bell, and a moveable plunger located concentrically within said bell and in alignment with said gauging probe, said moveable plunger being moveable in an upward or downward direction within said bell and substantially perpendicular to said base;
   encoder means actuated by said gauging means for providing electrical signals corresponding to the sagittal depth and thickness, respectively, of the lens;
   first digital means responsive to the electrical signals corresponding to the sagittal depth of the lens for producing a first digital output representing the sagittal depth of the lens;
   second digital means responsive to the electrical signals corresponding to the thickness of the lens for producing a second digital output representing the thickness of the lens; and
   display means responsive to the first and second digital outputs for displaying the sagittal depth and thickness, respectively, of the lens.

2. The digital gauge of claim 1, wherein said first digital means comprises a digital counter.

3. The digital gauge of claim 1, said encoder means comprising an optical encoder responsive to movement of said moveable plunger to derive a pair of quadrature-related signals comprising said electrical signals corresponding to the sagittal depth and thickness, respectively, of the lens, said digital gauge further comprising detector means responsive to said pair of quadrature-related signals for determining whether said moveable plunger is moving in the upward or downward direction and issuing a corresponding direction-indicating signal, said detector means issuing a further output signal indicating the extent of movement of the moveable plunger, said digital gauge further comprising counter means responsive to said direction-indicating signal for selectively counting upward or counting downward at a rate in accordance with said further output signal indicating the extent of movement of the moveable plunger.

4. The digital gauge of claim 3, wherein said detector means comprises a pair of edge detectors, one for receiving each of said pair of quadrature-related signals, said edge detectors issuing respective edge detector outputs, a multiply-by-four circuit for receiving and combining said edge detector outputs from said pair of edge detectors so as to produce a pulse output, a delaying comparator responsive to said pulse output for issuing a square wave output, and a further comparator for receiving said square wave output and one of said pair of quadrature-related signals for combining same to issue a signal having a first state during upward movement of said moveable plunger and having a second state during downward movement of said moveable plunger, said signal issued by said further comparator comprising said output of said detector means.

5. The digital gauge of claim 4, wherein said pulse output comprises individual pulses, and said detector means further comprises a pulse stretcher for receiving said pulse output of said multiply-by-four circuit, and for increasing the duration of the individual pulses of said pulse output so as to develop a clock signal for said binary counter means, said clock signal comprising said further output of said detector means, said detector means further comprising a zero-crossing latch connected to said binary counter means for detecting when said binary counter means arrives at a zero count and issuing a zero count output, said further comparator having an input connected to said zero-crossing latch and responsive to said zero count output for modifying said signal issued by said further comparator so that said signal issued by said further comparator changes state both in response to a change in the direction of movement of the moveable plunger and in response to said binary counter means arriving at zero count.

6. The digital gauge of claim 5, wherein said pulse stretcher comprises a delay flip-flop.

7. The digital gauge of claim 5, wherein said zero-crossing latch comprises an exclusive-OR gate connected to said binary counter means for detecting when the binary counter means arrives at the zero count, and issuing a corresponding output, and a delay flip-flop having an enable input connected to receive the corresponding output of said exclusive-OR gate.

8. The digital gauge of claim 4, wherein each said edge detector comprises a pair of exclusive-OR gates, one of said pair of exclusive-OR gates having an output connected to an input of the other of said pair of exclusive-OR gates, said one of said pair of exclusive-OR gates having one input grounded and another input connected, in common with a further input of said other exclusive-OR gate, to receive a given one of said pair of quadrature-related signals, said multiply-by-four circuit comprising a further exclusive-OR gate having two inputs respectively connected to an output of said other exclusive-OR gate in each respective said edge detector.

9. The digital gauge of claim 4, wherein said delaying comparator comprises a pair of delay flip-flops connected in series.

10. The digital gauge of claim 1, wherein said first digital means comprises a first digital counter and said second digital means comprises a second digital counter, said digital gauge further comprising reset means, one for each of said first and second digital counters, and responsive to operator commands for resetting said first and second digital counters, respectively, whereby to clear respective portions of said display means.

11. The digital gauge of claim 1, wherein said second digital means comprises retain means responsive to operator command for retaining said second digital output, whereby to retain display of the thickness of the lens.

12. The digital gauge of claim 1, further comprising a cabinet having a top surface comprising said base, said bell being mounted on the top surface of the cabinet, said moveable plunger comprising a first moveable plunger extending vertically upward from within the cabinet and through the center of the bell;
   said gauge further comprising a top portion located above the top surface of the cabinet and the bell, said gauging probe comprising a second moveable plunger extending vertically downward from the top portion and in alignment with the vertical upward extension of the first moveable plunger;
   said encoder means comprising a first optical encoder within the cabinet and associated with the first moveable plunger, said first optical encoder being responsive to movement of the first moveable plunger to provide said electrical signals representing the sagittal depth of the lens;

said encoder means further comprising a second optical encoder within the top portion and associated with the second moveable plunger, said second optical encoder being responsive to movement of the second moveable plunger to provide said electrical signals representing the thickness of the lens.

13. The digital gauge of claim 1, further comprising a cabinet having a top surface comprising said base, said bell being mounted on the top surface of the cabinet, said moveable plunger extending vertically upward from within the cabinet and through the center of the bell;

said digital gauge further comprising a top portion located above the top surface of the cabinet and the bell, said gauging probe comprising a fixed stop extending downwardly from the top portion in alignment with the vertical upward extension of the moveable plunger;

said encoder means comprising an optical encoder within the cabinet and responsive to the movement of the moveable plunger for providing electrical signals corresponding to said movement of the moveable plunger;

said first digital means comprising a first counter responsive to said electrical signals corresponding to said movement of the moveable plunger from a zeroing position relative to the bell to a first measuring position for counting from an initial count value to a further count value to develop said first digital output representing the sagittal depth of the lens;

said second digital means comprising a second counter responsive to said electrical signals corresponding to said movement of the moveable plunger from a zeroing position relative to said fixed stop to a second measuring position for counting from an initial count value to a further count value to develop said second digital output representing the thickness of the lens.

14. The digital gauge of claim 1, wherein placement of the lens on said bell and in contact with said moveable plunger actuates said encoder means to provide said electrical signal corresponding to the sagittal depth of the lens, and placement of the lens in contact with both said moveable plunger and said gauging probe actuates said encoder means to provide said electrical signal corresponding to the thickness of the lens.

15. A system for automatically computing the sagittal depth and thickness of a lens, comprising:

a base having a bell mounted thereon;

gauging means for gauging the sagittal depth and thickness, respectively, of the lens, said gauging means comprising a gauging probe located above said bell, and a moveable plunger located concentrically within said bell and in alignment with said gauging probe, said moveable plunger being moveable in an upward or downward direction within said bell and substantially perpendicular to said base;

encoder means actuated by said gauging means for providing electrical signals corresponding to the sagittal depth and thickness, respectively, of the lens;

digital means responsive to the electrical signals corresponding to the sagittal depth and thickness, respectively, of the lens for producing first and second digital outputs representing the sagittal depth and thickness, respectively, of the lens; and processor means for receiving and processing said first and second digital outputs to derive the thickness and sagittal depth, respectively, of the lens.

16. The system of claim 15, wherein said processor means issues a first control signal requesting said first digital output and a second control signal requesting said second digital output, said system further comprising digit select means connected between said digital means and said processor means, and responsive to said first and second control signals for providing said first and second digital outputs, respectively, to said processor means.

17. The system of claim 15, wherein said digital means comprises a sagittal depth counter providing said first digital output and a thickness counter providing said second digital output, at least one of said sagittal depth counter and said thickness counter including retain means for retaining a corresponding one of said first and second digital outputs.

18. A method of measuring the sagittal depth and thickness of a lens to be measured utilizing a digital gauge unit having a top surface, a bell mounted on the top surface of the unit, a first moveable plunger extending vertically through the center of the bell, a top portion above the top surface of the unit, and a second moveable plunger extending vertically downward from the top portion in alignment with the vertical upward extension of the first moveable plunger, said method comprising the steps of:

(a) placing a flat lens on the first moveable plunger and lowering the lens and the first moveable plunger to contact the bell so as to calibrate the first moveable plunger;

(b) removing the flat lens from the bell;

(c) placing the lens to be measured on the bell so as to displace the first moveable plunger, and so as to measure the sagittal depth of the lens to be measured;

(d) moving the second moveable plunger vertically downward from the top portion and through a displacement distance so as to contact the lens to be measured; and (e) computing the thickness of the lens to be measured based on the sagittal depth of the lens to be measured, as measured in step (c), and the displacement of the second moveable plunger.

19. A method of measuring the sagittal depth and thickness of a lens to be measured utilizing a digital gauge unit having a top surface, a bell mounted on the top surface of the unit, a moveable plunger extending vertically through the center of the bell, a sagittal depth counter and a thickness counter connected to the moveable plunger, and a fixed stop located above the top surface and the bell and extending vertically downward toward the moveable plunger in alignment therewith, said method comprising the steps of:

(a) moving the moveable plunger vertically upward to contact the fixed stop;

(b) resetting the thickness counter;

(c) lowering the moveable plunger;

(d) placing a flat lens on the moveable plunger and lowering the flat lens and moveable plunger so that the flat lens contacts the bell;

(e) resetting the sagittal depth counter;
(f) removing the flat lens and placing the lens to be measured on the bell so as to displace the moveable plunger, and so as to measure the sagittal depth of the lens to be measured; and
(g) moving the lens to be measured and the moveable plunger vertically upward until the lens to be measured contacts the fixed stop so as to measure the thickness of the lens to be measured.

20. A method of measuring the sagittal depth and thickness of a lens to be measured utilizing a digital gauge unit having a top surface, a bell mounted on the top surface of the unit, a moveable plunger extending vertically through the center of the bell, a sagittal depth counter and a thickness counter connected to the moveable plunger, and a fixed stop located above the top surface and the bell and extending vertically downward toward the moveable plunger, said method comprising the steps of:

(a) placing a flat lens on the moveable plunger and lowering the flat lens and moveable plunger so that the flat lens contacts the bell;
(b) resetting the sagittal depth counter;
(c) removing the flat lens and moving the moveable plunger vertically upward to contact the fixed stop;
(d) resetting the thickness counter;
(e) lowering the moveable plunger;
(f) placing the lens to be measured on the moveable plunger and moving the lens to be measured and the moveable plunger vertically upward until the lens to be measured contacts the fixed stop so as to measure the thickness of the lens to be measured;
(g) retaining the measurement of the thickness of the lens; and
(h) moving the lens and the moveable plunger downward until the lens contacts the bell, so as to measure the sagittal depth of the lens.

* * * * *